Patented May 31, 1949

2,471,435

UNITED STATES PATENT OFFICE 2,471,435

INGREDIENT FOR PREPARED FOOD MIXES
AND PROCESS OF PREPARING SAME

Mary H. Kimball, Chastain G. Harrel, and Robert O. Brown, Minneapolis, Minn., assignors to Pillsbury Mills, Inc., Minneapolis, Minn., a corporation of Delaware No Drawing. Application February 18, 1946
Serial No. 648,560

6 Claims. (Cl. 99—144)

This invention relates to dried powdered ingredients useful in food mixes, to the process for preparing such ingredients and to dry salad dressings including therein such ingredients.

It is one of the main objects of this invention to provide a novel dry salad dressing which can be kept without substantial deterioration for long periods in ordinary storage, can be packed without being placed in water-proof containers, and can be very quickly mixed up to form a fresh fluid salad dressing for immediate use by addition thereto of an aqueous solution.

Another object is to provide a dried powdered ingredient for use in prepared mixes, the particles of which include fat globules and egg fractions encysted within a gelatinized starchy substance which will act to protect the fat and egg from deterioration for long periods of time and which at the same time will readily disperse so as to make the fat globules and egg fractions available for use when an aqueous solution is mixed with the ingredient.

Other objects are to provide novel processes for preparing the ingredient for use in food mixes above referred to and for preparing the dry salad dressing above referred to.

The objects and advantages of the invention will more fully appear from the following description.

In accordance with the invention, flour or starch with or without sugar is first mixed with water and the starch content is gelatinized as by applying heat. Thereafter an edible fat, preferably a hydrogenated vegetable fat, is added and mixed with the gelatinized flour or gelatinized starch preparation, whereupon the preparation is cooled to a temperature that will not cause cooking or deterioration of egg yolks, the temperature permitted being somewhat higher than ordinary room temperature. Thereupon there is added to the preparation and mixed therewith liquid egg yolks or liquid eggs, and thereafter the preparation is spray-dried to produce particles comprising both fat globules and egg fractions encysted by dried gelatinized flour, with or without sugar, or dried gelatinized starch, with or without sugar. For certain uses, where cooking of the egg or egg yolks is not detrimental to or is desirable in the product the cooling step may be eliminated.

To prepare a dry powdered salad dressing, there is added to and mixed with the dried particles thus produced, dry condiments.

This dry salad dressing can be held in ordinary room storage, either in bulk or in packages, for long periods of time without substantial deterioration of the contents thereof. Also it can be frozen or subjected to varying temperatures without affecting the same. There is no chance of bacterial contamination which might cause food poisoning. At any time after being prepared, the dry powdered salad dressing can be mixed with any aqueous solution in a very short time to produce a fluid salad dressing having the same general taste and appearance as a freshly prepared salad dressing and having the same general taste and appearance of prepared salad dressings now on the market and sold only in glass or other water- and air-tight containers. Many different types of salad dressings can be prepared from the dry salad dressing of the invention to suit individual tastes. In addition to adding water alone to the dry salad dressing when it is to be made into a fluid dressing for use, the juices of various fruits, vegetables, soft drinks, and other beverages and liquids or a mixture of these, with or without other food products such, for example, as cheeses of various types, onions, chives, and other ingredients can be employed.

The dry powdered ingredient consisting of fat globules and egg fractions encysted within the gelatinized starchy ingredient can also be employed in many different types of foods, such as pancake, waffle, biscuit, cake, doughnut, and bread mixes, and can also be used in soups, puddings, pie filling mixes, sauces, and elsewhere where both fats and eggs are desired as ingredients in the finished product, the chief value of course of the ingredient of the invention being in dry mixes.

In preparing the dried shortening and egg ingredient it is preferable to add some sugar to the water and flour or starch prior to gelatinization of the starch content inasmuch as, if sugar is added before the spray-drying step, the powdered product produced will be more readily soluble and dispersible in water.

As an example of how the dried powdered ingredient consisting of the fat globules and egg fractions encysted in gelatinized flour may be prepared, the following is given: 27.3 lb. of durum wheat flour, 15.5 lb. of cane or beet sugar, and 4.83 lb. of corn sugar are added to 232 lb. of water and thoroughly mixed therewith. Thereafter the mixture is brought to a boil and boiled for approximately 10 minutes, the boiling temperature being approximately 102° C. Thereafter 42.5 lb. of low melting point hydrogenated vegetable fat is added to the mixture while hot and thoroughly mixed therewith for approximately 10 minutes. A typical fat that can be employed is one containing both cottonseed and corn oil, such fats being readily now available on the market. After the fat has been added and mixed, the composition is cooled to 35° C., and thereafter 10.66 lbs. of fluid egg yolk, preferably obtained from fresh eggs, are added and mixed for approximately 10 minutes. The entire composition is then spray-dried at 1750 lb. per square inch pressure, utilizing a number 72 nozzle, the tail temperature being 72° C. Starch can be interchanged with flour in the above preparation.

To produce a dry powdered salad dressing, there is employed 94.63% by weight of the above described spray-dried ingredient, and there are added and mixed therewith 3.05% salt, 0.45% dry mustard, 0.50% paprika, 0.03% mace, 0.04% white pepper, and 1.30% pulverized citric acid.

To prepare one type of fresh salad dressing from the final dry salad dressing preparation, approximately 167 cc. of water will be added to 100 grams of the dry salad dressing and the whole will be stirred or beaten together until smooth. In place of some or all of the water, any of the heretofore referred to liquids or solids or a mixture thereof in varying amounts may be employed.

In preparing the dried powdered fat and egg ingredient, different types of flour or a mixture thereof may be used. Flours capable of use are wheat, corn, rye, oat, or barley flour or any other flours containing starch. In place of flour, starch can be employed, the starches being produced from any available source, such as wheat, corn, potatoes, etc.

The various oil type fats can be employed, such as corn, cottonseed, soy, peanut, and olive oils or mixes thereof or hydrogenated shortenings of various melting points dictated by taste and other physical properties, such as color and texture desired in the product. Hydrogenated fats are preferred because of better keeping qualities and stability.

The proportion of water, flour or starch, and fat employed in producing the dried powdered fat and egg ingredient can be varied depending on the qualities desired in the product. The fat can run up to as high as 75% by weight of the dry powdered ingredient.

Also considerable range in temperature variation and in the heating period to gelatinize the starch content can be made. When higher temperatures are employed, the shorter the heating period required, and vice versa.

Considerable variation also can be made in the proportions of the egg yolks employed. Thus the solid constituents of the egg yolk may run from 1% to 15% by weight of the total solids of the product. Fresh egg yolks, dried egg yolks, or frozen egg yolks can be employed, or if desired, whole eggs, either fresh, dried, or frozen, can be employed instead of the egg yolks. If dried egg yolks or dried eggs are used, the dried egg yolks or dried eggs will be first prepared into an aqueous solution by the addition of water thereto before the egg yolks or eggs are added to the mixture of gelatinized flour or starch and fat. Similarly, if frozen egg yolks or eggs are employed, the same will be first thawed before use.

In our joint application for patent entitled "Dry salad dressing," Serial No. 648,559, filed February 18, 1946, a dry salad dressing was disclosed wherein the egg ingredient was not mixed with or dried with the gelatinized starchy ingredient and the water, and accordingly the egg ingredient was not encysted by the gelatinized flour or gelatinized starch. The present preparation has considerable advantage over the preparation disclosed in our said application for patent for the reason that by encysting not only the fat globules but also the egg fractions in the gelatinized flour or gelatinized starch, deterioration and spoilage of the egg ingredient cannot take place, giving the present product much better keeping qualities than in the case of the product referred to in the said application.

When a dry salad dressing is to be prepared from the dried powdered fat and egg ingredient heretofore referred to, the spices and other condiments employed and the quantities of each can be varied to suit individual tastes. Other acids than citric acid can be employed. Thus acetic acid or other acid salts that are suitable for food use can be used.

It will be seen that highly advantageous products and processes have been developed.

The invention consists in the matter described and set forth in the appended claims.

We claim:
1. As an ingredient for prepared mixes, dry particles consisting of fat globules and egg fractions encysted within a gelatinized starchy substance and sugar.
2. As an ingredient for prepared mixes, dry particles consisting of fat globules and egg fractions encysted within gelatinized flour and sugar.
3. As an ingredient for prepared mixes, dry particles consisting of fat globules and egg fractions encysted within gelatinized starch and sugar.
4. A dry salad dressing capable of being mixed with an aqueous solution to produce a fresh fluid salad dressing and consisting of dried particles including fat globules and egg fractions encysted within a gelatinized starchy substance and sugar, and dried powdered condiments mixed with said particles.
5. The process of preparing an ingredient for food mixes which consists in first mixing a starch-containing substance and sugar with water, gelatinizing the starch, adding an edible fat to the gelatinized starch mixture, adding and mixing fluid egg parts to the mixture and spray-drying the mixture to produce a dry powder, the particles of which include fat globules and egg fractions encysted within the gelatinized starchy substance.
6. The process of preparing a dried powdered ingredient for food mixes which consists in first mixing a starch-containing substance and sugar with water, heating the same to gelatinize the starch, adding an edible fat to the gelatinized starch mixture, cooling the same, adding fluid egg yolks to the mixture, and thereafter spray-drying the preparation to produce a dry powder, the particles of which include fat globules and egg yolk fractions encysted in gelatinized starch and sugar.

MARY H. KIMBALL.
CHASTAIN G. HARREL.
ROBERT O. BROWN.

REFERENCES CITED

The following references are of record in the file of this patent:

UNITED STATES PATENTS

| Number | Name | Date |
|---|---|---|
| 1,431,938 | Dunham | Oct. 17, 1922 |
| 1,432,057 | Dunham | Oct. 17, 1922 |
| 1,701,085 | Richardson et al. | Feb. 5, 1929 |
| 1,928,781 | Chapin | Oct. 3, 1933 |
| 2,035,899 | Kraft | Mar. 31, 1936 |
| 2,065,676 | Fechner | Dec. 29, 1936 |
| 2,168,360 | Musher | Aug. 8, 1939 |
| 2,392,833 | Chapin | Jan. 15, 1946 |
| 2,431,497 | North et al. | Nov. 25, 1947 |